United States Patent
Irie

(10) Patent No.: US 10,419,118 B2
(45) Date of Patent: Sep. 17, 2019

(54) OPTICAL TRANSMISSION DEVICE AND OPTICAL TRANSMISSION METHOD

(71) Applicant: FUJITSU LIMITED, Kawasaki-shi, Kanagawa (JP)

(72) Inventor: Hiroyuki Irie, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/021,557

(22) Filed: Jun. 28, 2018

(65) Prior Publication Data
US 2019/0013866 A1     Jan. 10, 2019

(30) Foreign Application Priority Data
Jul. 5, 2017   (JP) ................ 2017-132003

(51) Int. Cl.
| H04J 14/06 | (2006.01) |
| H04B 10/2543 | (2013.01) |
| H04B 10/293 | (2013.01) |
| H04B 10/516 | (2013.01) |

(52) U.S. Cl.
CPC ..... H04B 10/2543 (2013.01); H04B 10/2939 (2013.01); H04B 10/516 (2013.01); H04J 14/06 (2013.01)

(58) Field of Classification Search
CPC ............ H04B 10/2543; H04B 10/2939; H04B 10/58; H04J 14/06
See application file for complete search history.

(56) References Cited

U.S. PATENT DOCUMENTS

| 2012/0076235 A1* | 3/2012 | Dou ............... H04B 10/2543 375/296 |
| 2013/0077979 A1* | 3/2013 | Dou ............... H04B 10/2543 398/192 |
| 2015/0282144 A1* | 10/2015 | Tomeba ............ H04B 7/0456 370/329 |

(Continued)

FOREIGN PATENT DOCUMENTS

| JP | 2012-075097 | 4/2012 |
| JP | 2015-8355 | 1/2015 |
| WO | 2014/077139 | 5/2014 |

OTHER PUBLICATIONS

Zhenning Tao et al., "Multiplier-Free Intrachannel Nonlinearity Compensating Algorithm Operating at Symbol Rate", Journal of Lightwave Technology, vol. 29, No. 17, pp. 2570-2576, Sep. 1, 2011 (7 pages).

*Primary Examiner* — Dzung D Tran
(74) *Attorney, Agent, or Firm* — Fujitsu Patent Center

(57) ABSTRACT

An optical transmission device includes: a memory; and a processor coupled to the memory; the processor: generate a first symbol by mapping a transmission data series to a first signal point which belongs to a first group within a signal space defined with regard to characteristics of an optical carrier wave of the transmission data series; generate a second symbol by mapping the transmission data series to a second signal point belonging to a second group; calculate a perturbation quantity of a signal electric field for each of the first and second symbols based on signal electric field vector information of a symbol which is generated before the first symbol and the second symbol; and determine, as a transmission signal, a symbol having a smaller perturbation quantity between the first symbol and the second symbol.

16 Claims, 7 Drawing Sheets

(56) References Cited

U.S. PATENT DOCUMENTS

| | | | |
|---|---|---|---|
| 2015/0295643 A1* | 10/2015 | Zhao | H04B 10/0795 398/29 |
| 2016/0036528 A1* | 2/2016 | Zhao | H04B 10/58 398/141 |
| 2016/0173175 A1* | 6/2016 | Tomeba | H04B 7/0417 370/329 |
| 2016/0294480 A1* | 10/2016 | Mertz | H04B 10/6163 |

* cited by examiner

FIG. 3

| TRANSMISSION DATA SERIES | | MAPPING | | | |
|---|---|---|---|---|---|
| | | X-I | X-Q | Y-I | Y-Q |
| SET 1 | 000 | 1 | 1 | 1 | 1 |
| | 001 | 1 | 1 | 0 | 0 |
| | 010 | 1 | 0 | 1 | 0 |
| | 100 | 1 | 0 | 0 | 1 |
| | 011 | 0 | 0 | 0 | 0 |
| | 101 | 0 | 0 | 1 | 1 |
| | 110 | 0 | 1 | 0 | 1 |
| | 111 | 0 | 1 | 1 | 0 |
| SET 2 | 000 | 1 | 1 | 1 | 0 |
| | 001 | 1 | 1 | 0 | 1 |
| | 010 | 1 | 0 | 1 | 1 |
| | 100 | 0 | 1 | 1 | 1 |
| | 011 | 0 | 0 | 0 | 1 |
| | 101 | 0 | 0 | 1 | 0 |
| | 110 | 0 | 1 | 0 | 0 |
| | 111 | 1 | 0 | 0 | 0 |

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2017-132003, filed on Jul. 5, 2017, the entire contents of which are incorporated herein by reference.

FIELD

The embodiment discussed herein is related to an optical transmission device and an optical transmission method.

BACKGROUND

A polarization multiplexing system has been put to practical use as one of technologies that increase the transmission capacity of an optical signal. In the polarization multiplexing system, a signal may be transmitted by using one pair of polarized waves orthogonal to each other.

A related technology is disclosed in Japanese Laid-open Patent Publication No. 2012-075097 or Non-Patent Document: Zhenning Tao et al., "Multiplier-Free Intrachannel Nonlinearity Compensating Algorithm Operating at Symbol Rate," JOURNAL OF LIGHTWAVE TECHNOLOGY, VOL. 29, NO. 17, Sep. 1, 2011.

SUMMARY

According to an aspect of the embodiment, an optical transmission device includes: a memory; and a processor coupled to the memory; the processor: generate a first symbol by mapping a transmission data series to a first signal point which belongs to a first group within a signal space defined with regard to characteristics of an optical carrier wave of the transmission data series; generate a second symbol by mapping the transmission data series to a second signal point belonging to a second group; calculate a perturbation quantity of a signal electric field for each of the first and second symbols based on signal electric field vector information of a symbol which is generated before the first symbol and the second symbol; and determine, as a transmission signal, a symbol having a smaller perturbation quantity between the first symbol and the second symbol.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a configuration of sets;

DESCRIPTION OF EMBODIMENT

When an optical signal propagates within an optical fiber, a nonlinear effect occurs, and transmission quality and transmission efficiency are degraded by an increase in transmission error rate or the like. Therefore, in a polarization multiplexing system, transmission quality and transmission efficiency are improved by compensating for nonlinear characteristics.

For example, nonlinear characteristics are compensated for in a nonlinear pre-equalization method (perturbation pre-distortion: PPD). For example, in the nonlinear pre-equalization method, a nonlinear amplitude resulting from self-phase modulation of a polarization multiplexed optical signal is calculated by approximately solving a Schroedinger nonlinear equation describing optical characteristics propagating through an optical fiber. According to this calculating method, electric field information of an optical signal arriving at an optical receiver includes a perturbation component $\Delta u$ resulting from a nonlinear effect. Therefore, in the nonlinear pre-equalization method, the optical receiver may receive an optical signal in which the perturbation component is compensated for by subtracting the perturbation component $\Delta u$ from the transmission signal in advance in an optical transmitter.

The nonlinear pre-equalization method has a great effect of compensating for a nonlinear component, but involves a very large amount of calculation for implementing the nonlinear pre-equalization method. Therefore, when compensation processing by the nonlinear pre-equalization method is performed in the optical transmitter, the power consumption of the optical transmitter may be increased.

As an example, a configuration or a method that suppresses a nonlinear degradation with a small amount of calculation may be provided.

An optical communication system will be taken as an example in the following. However, the disclosed technology may be applied to all of communication systems in which a characteristic degradation due to nonlinearity is present.

Figure 1:
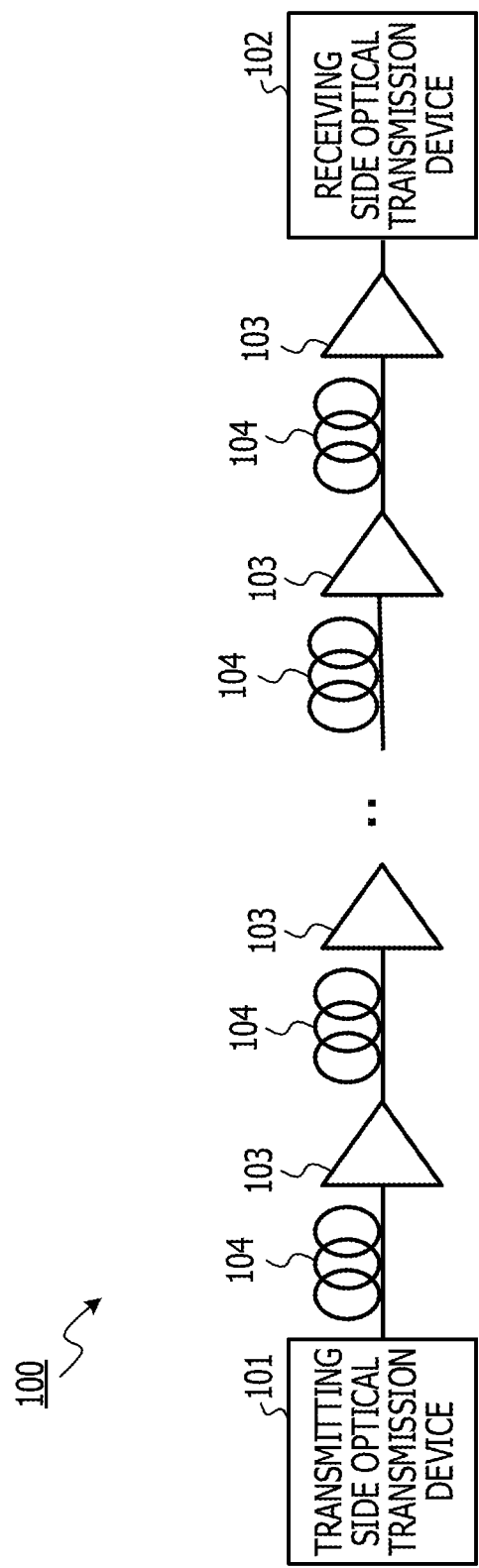
FIG. 1 illustrates an example of an optical communication system.

FIG. 1 illustrates an example of an optical communication system. In this optical communication system, a transmitting side optical transmission device 101 maps a transmission data series to a signal point within a signal space defined with regard to characteristics of an optical carrier wave such as amplitude, phase, or the like, and the transmitting side optical transmission device 101 transmits the mapped transmission data series. The optical carrier wave is, for example, a vertically polarized wave and a horizontally polarized wave in a polarization multiplexed optical signal. The signal space is defined with respect to a combination of one of phase modulation, amplitude modulation, and quadrature amplitude modulation of the vertically polarized wave and one of phase modulation, amplitude modulation, and quadrature amplitude modulation of the horizontally polarized wave as characteristics of the optical carrier wave.

A signal transmitted by the transmitting side optical transmission device 101 arrives at a receiving side optical transmission device 102 after passing through optical fibers 104 and optical devices 103 (optical amplifiers, dispersion compensating optical fibers, or the like).

Figure 2:
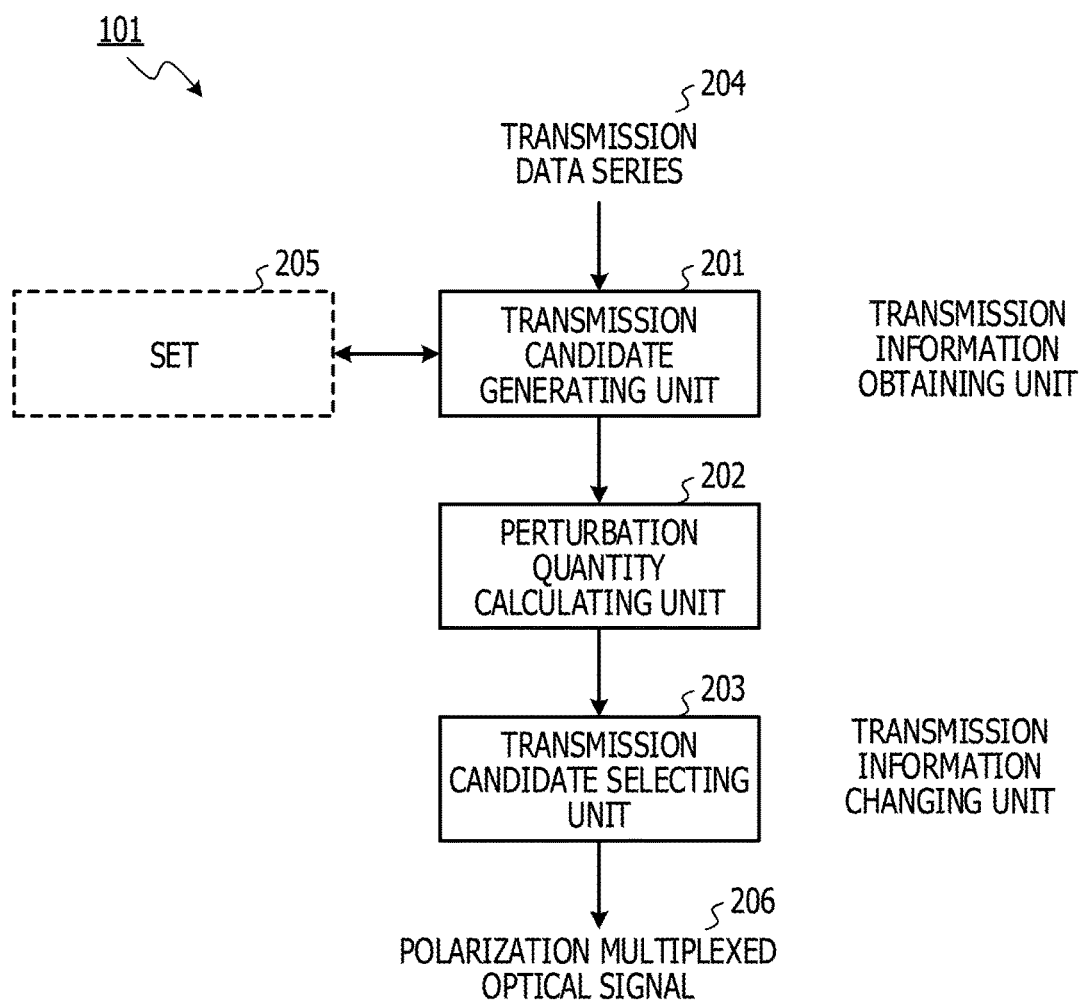
FIG. 2 illustrates an example of a transmitting side optical transmission device.

FIG. 2 illustrates an example of a constitution of the transmitting side optical transmission device 101 in FIG. 1. The transmitting side optical transmission device 101 is supplied with a transmission data series 204. The transmitting side optical transmission device 101 includes a transmission candidate generating unit 201 and signal point sets 205 accompanying the transmission candidate generating unit 201, a perturbation quantity calculating unit 202, and a transmission candidate selecting unit 203. The transmitting side optical transmission device 101 outputs a polarization multiplexed optical signal 206. The transmission candidate generating unit 201, the perturbation quantity calculating unit 202, and the transmission candidate selecting unit 203 may function by execution of a program by a processor, for example.

As an example, the following equations are obtained with regard to a nonlinear amplitude resulting from self-phase modulation of a polarization multiplexed signal by perturbatively and approximately solving the Schroedinger nonlinear equation describing optical characteristics propagating through an optical fiber.

$$u = u_0 + \Delta u \quad \text{[Expression 1]}$$

$$\Delta u_x = \sum_{m,n} P_0^{3/2} (A_{n,x} A^*_{m+n,x} A_{m,x} + A_{n,y} A^*_{m+n,y} A_{m,x}) C_{m,n}$$

$$\Delta u_y = \sum_{m,n} P_0^{3/2} (A_{n,y} A^*_{m+n,y} A_{m,y} + A_{n,x} A^*_{m+n,x} A_{m,y}) C_{m,n}$$

u is a signal electric field amplitude, $u_0$ is a linear component of the signal electric field amplitude, $\Delta u$ is a nonlinear component of the signal electric field amplitude, $P_0$ is a signal peak power, and A is the vector of a signal electric field. m and n are suffixes indicating a number of symbols by which a symbol precedes or succeeds a target symbol as a reference, the target symbol being a symbol as a target for calculating the nonlinear amplitude. Details of the target symbol will be described later with reference to FIG. 4. x and y are suffixes indicating the x-polarized wave component and y-polarized wave component of the polarization multiplexed signal. C is a coefficient determined by a transmission line parameter.

The perturbation quantity calculating unit 202 in FIG. 2 calculates a x-polarized wave component $\Delta u_x$ and a y-polarized wave component $\Delta u_y$ of the nonlinear component of the signal electric field amplitude by performing the operation illustrated in equations of the above Expression 1, and calculates a nonlinear component $\Delta u$ (hereinafter a perturbation quantity) of the signal electric field as a sum of the x-polarized wave component $\Delta u_x$ and the y-polarized wave component $\Delta u_y$.

Suppose that the transmission data series 204 is known at a time of transmission. It is also clear from the equations of the above Expression 1 how the transmission data series 204 acts on the nonlinear amplitude in the optical fibers 104 (FIG. 1) and the like. Hence, consideration will be given to suppressing nonlinear degradation by transmitting such a transmission data series 204 as increases the nonlinear amplitude after making a change to the transmission data series 204 in advance.

Description will be made based on a dual polarization-quadrature shift keying (DP-QPSK) system, for example. First, for each of an X-polarized wave and a Y-polarized wave of DP-QPSK, rectangular coordinates are defined which are constituted of an I-axis (In Phase) representing an in-phase component of each polarized wave and a Q-axis (Quadrature Phase) representing a quadrature phase component of each polarized wave. The I-axis and Q-axis of the X-polarized wave will be denoted as "X-I" and "X-Q," respectively, and the I-axis and Q-axis of the Y-polarized wave will be denoted as "Y-I" and "Y-Q," respectively. In this case, one symbol within a signal space of DP-QPSK is determined by a combination of a value 0 or 1 on the X-I axis, a value 0 or 1 on the X-Q axis, a value 0 or 1 on the Y-I axis, and a value 0 or 1 on the Y-Q axis. Hence, $2^4 = 16$ symbols may be defined in the signal space of DP-QPSK. For example, DP-QPSK may be regarded as a four-dimensional modulation system as one form of a multidimensional modulation system, and 16 signal points are present on a four-dimensional space of DP-QPSK.

FIG. 3 illustrates an example of a configuration of sets. The signal space determined by the respective values 0 or 1 on the X-I axis, the X-Q axis, the Y-I axis, and the Y-Q axis is divided into two sets, a set 1 and a set 2, as illustrated in FIG. 3. Then, the transmission data series 204 in units of three bits is mapped to the set 1 and the set 2 in a duplicated manner, as illustrated in FIG. 3. For example, in FIG. 3, a transmission data series 204 "000" is mapped to a signal point determined by (X-I, X-Q, Y-I, Y-Q)=(1, 1, 1, 1) within the set 1. In addition, the transmission data series 204 "000" is also mapped to a signal point determined by (X-I, X-Q, Y-I, Y-Q)=(1, 1, 1, 0) within the set 2. Each of the other values of the transmission data series 204 is also similarly mapped to signal points within the set 1 and signal points within the set 2.

For example, the transmission candidate generating unit 201 in FIG. 2 divides the transmission data series 204 input sequentially into units of three bits, and maps the units of three bits to symbols within the set 1 and symbols within the set 2 in a duplicated manner according to the correspondence relation of FIG. 3 corresponding to the sets 205 in FIG. 2. The transmission candidate generating unit 201 thereby generates transmission candidates in each of the two sets. Therefore, DP-QPSK, which originally enables transmission of 4 bits/symbol, is decreased to 3 bits/symbol.

Figure 4:
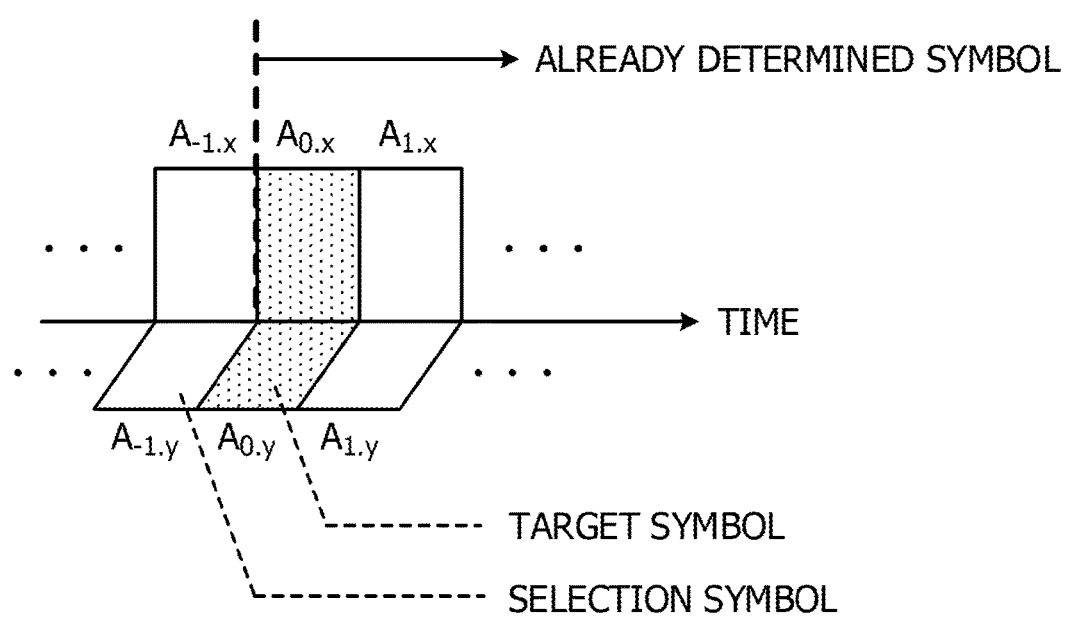
FIG. 4 illustrates an example of operation of a perturbation quantity calculating unit.

FIG. 4 illustrates an example of operation of the perturbation quantity calculating unit 202 in FIG. 2 in DP-QPSK. In FIG. 4, the target symbol is a symbol as a target for the perturbation quantity calculating unit 202 to calculate a perturbation quantity due to a nonlinear effect. In this case, in calculating the perturbation quantity, the perturbation quantity calculating unit 202 considers the target symbol, a first previous symbol with respect to the target symbol, which is a symbol determined one before the target symbol, and a first subsequent symbol with respect to the target symbol, which is a symbol one after the target symbol. Then, the first subsequent symbol with respect to the target symbol is a symbol to be hereafter selected (hereinafter referred to as a "selection symbol"). In FIG. 4, $A_{0,\,x}$ and $A_{0,\,y}$ are respectively a signal electric field vector of an x-polarized wave of the target symbol and a signal electric field vector of a y-polarized wave of the target symbol. In addition, $A_{1,\,x}$ and $A_{1,\,y}$ are respectively a signal electric field vector of an x-polarized wave of the first previous symbol with respect to the target symbol and a signal electric field vector of a y-polarized wave of the first previous symbol with respect to the target symbol. Further, $A_{-1,\,x}$ and $A_{-1,\,y}$ are respectively a signal electric field vector of an x-polarized wave of the selection symbol as the first subsequent symbol with respect to the target symbol and a signal electric field vector of a y-polarized wave of the selection symbol.

As described above, the first previous symbol with respect to the target symbol and the target symbol are already determined symbols. Thus, the signal electric field vectors $A_{1,x}$ and $A_{1,y}$ of the first previous symbol with respect to the target symbol and the signal electric field vectors $A_{0,x}$ and $A_{0,y}$ of the target symbol are known.

On the other hand, $A_{-1,x}$ and $A_{-1,y}$ of the selection symbol as the first subsequent symbol with respect to the target symbol are signal electric field vectors of an unknown symbol to be hereafter determined.

The perturbation quantity calculating unit 202 first sets a symbol mapped to the set 1 by the transmission information obtaining unit 201 as the selection symbol, and sets the signal electric field vectors of the selection symbol as $A_{-1,x}$ and $A_{-1,y}$. The perturbation quantity calculating unit 202 performs the operation of the equations of Expression 1 based on $A_{-1,x}$ and $A_{-1,y}$ of the selection symbol, already determined $A_{0,x}$ and $A_{0,y}$ (target symbol), and $A_{1,x}$ and $A_{1,y}$ (first previous symbol). As a result, $\Delta u = \Delta u_x + \Delta u_y$ in a case where the candidate belonging to the set 1 is selected is calculated as a perturbation quantity.

The perturbation quantity calculating unit 202 next sets a symbol mapped to the set 2 by the transmission information obtaining unit 201 as the selection symbol, and sets the signal electric field vectors of the selection symbol as $A_{-1,x}$ and $A_{-1,y}$. Then, the perturbation quantity calculating unit 202 performs the operation of the equations of Expression 1 based on $A_{-1,x}$ and $A_{-1,y}$ of the new selection symbol, and already determined $A_{0,x}$ and $A_{0,y}$ and $A_{1,x}$ and $A_{1,y}$ as in the case of the set 1. As a result, $\Delta u = \Delta u_x + \Delta u_y$ in a case where the candidate belonging to the set 2 is selected is calculated as a perturbation quantity.

The transmission candidate selecting unit 203 selects the candidate corresponding to the smaller of the perturbation quantities $\Delta u$ calculated by the perturbation quantity calculating unit 202 for the set 1 and the set 2, respectively, determines the candidate as a transmission signal, and generates a polarization multiplexed optical signal 206. The above operation of FIG. 4 is sequentially performed while symbols are shifted one by one.

The signal received by the receiving side optical transmission device 102 is subjected to hard decision, and data of 4 bits/symbol is obtained from the combination of the X- and Y-polarized waves. The data is associated with data of 3 bits/symbol according to the sets 205 of the transmitting side optical transmission device. The transmission data series is thus reproduced completely.

Figure 5:
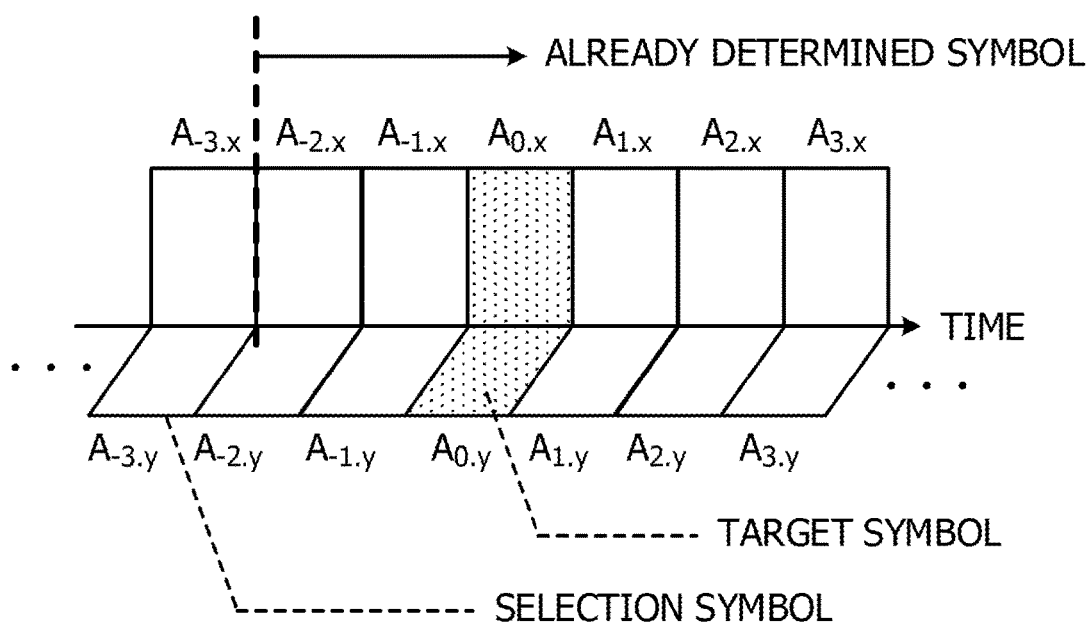
FIG. 5 illustrates an example of operation of a perturbation quantity calculating unit.

FIG. 5 illustrates an example in which the operation of the perturbation quantity calculating unit 202 in FIG. 2, the operation corresponding to FIG. 4, is extended to three preceding symbols and three succeeding symbols. In FIG. 5, the meaning of the target symbol is similar to that in FIG. 4. In this operation example, in calculating a perturbation quantity, the perturbation quantity calculating unit 202 considers the target symbol, up to three previous symbols with respect to the target symbol, and up to three subsequent symbols with respect to the target symbol. Then, a third subsequent symbol with respect to the target symbol, which is three symbols after the target symbol, is the selection symbol to be hereafter selected. In FIG. 5, $A_{0,x}$ and $A_{0,y}$ are respectively a signal electric field vector of an x-polarized wave of the target symbol and a signal electric field vector of a y-polarized wave of the target symbol, and are similar to those in FIG. 4. In addition, $A_{1,x}$ and $A_{1,y}$, $A_{2,x}$ and $A_{2,y}$, and $A_{3,x}$ and $A_{3,y}$ are respectively signal electric field vectors of x-polarized waves of the first previous symbol, a second previous symbol, which is a symbol two before the target symbol, and a third previous symbol, which is a symbol three before the target symbol, with respect to the target symbol and signal electric field vectors of y-polarized waves of the first previous symbol, the second previous symbol, and the third previous symbol with respect to the target symbol. In addition, $A_{-1,x}$ and $A_{-1,y}$ and $A_{-2,x}$ and $A_{-2,y}$ are respectively signal electric field vectors of x-polarized waves of the first subsequent symbol and the second subsequent symbol, which is a symbol two after the target symbol, with respect to the target symbol and signal electric field vectors of y-polarized waves of the first subsequent symbol and the second subsequent symbol with respect to the target symbol. Further, $A_{-3,x}$ and $A_{-3,y}$ are a signal electric field vector of an x-polarized wave of the third subsequent symbol, which is the selection symbol, with respect to the target symbol and a signal electric field vector of a y-polarized wave of the third subsequent symbol, which is the selection symbol, with respect to the target symbol.

As described above, symbols from the third previous symbol with respect to the target symbol to the second subsequent symbol with respect to the target symbol are already determined symbols. Therefore, $A_{3,x}$ and $A_{3,y}$, $A_{2,x}$ and $A_{2,y}$, $A_{1,x}$ and $A_{1,y}$, $A_{-1,x}$ and $A_{-1,y}$, and $A_{-2,x}$ and $A_{-2,y}$ are known.

On the other hand, $A_{-3,x}$ and $A_{-3,y}$ of the third subsequent symbol with respect to the target symbol are signal electric field vectors of the unknown selection symbol to be hereafter determined.

The perturbation quantity calculating unit 202 first sets a symbol mapped to the set 1 by the transmission candidate generating unit 201 as the selection symbol, and sets the signal electric field vectors of the selection symbol as $A_{-3,x}$ and $A_{-3,y}$. Then, the perturbation quantity calculating unit 202 performs the operation of the equations of Expression 1 based on $A_{-3,x}$ and $A_{-3,y}$ of the selection symbol and already determined $A_{-2,x}$ and $A_{-2,y}$, $A_{-1,x}$ and $A_{-1,y}$, $A_{0,x}$ and $A_{0,y}$, $A_{1,x}$ and $A_{1,y}$, $A_{2,x}$ and $A_{2,y}$, and $A_{3,x}$ and $A_{3,y}$. As a result, $\Delta u = \Delta u_x + \Delta u_y$ in a case where the candidate belonging to the set 1 is selected is calculated as a perturbation quantity.

The perturbation quantity calculating unit 202 next sets a symbol mapped to the set 2 by the transmission candidate generating unit 201 as the selection symbol, and sets the signal electric field vectors of the selection symbol as $A_{-3,x}$ and $A_{-3,y}$. The perturbation quantity calculating unit 202 performs the operation of the equations of Expression 1 based on $A_{-3,x}$ and $A_{-3,y}$ of the new selection symbol and already determined $A_{-2,x}$ and $A_{-2,y}$, $A_{-1,x}$ and $A_{-1,y}$, $A_{0,x}$ and $A_{0,y}$, $A_{1,x}$ and $A_{1,y}$, $A_{2,x}$ and $A_{2,y}$, and $A_{3,x}$ and $A_{3,y}$ as in the case of the set 1. As a result, $\Delta u = \Delta u_x + \Delta u_y$ in a case where the candidate belonging to the set 2 is selected is calculated as a perturbation quantity.

The operation of the transmission candidate selecting unit 203 in the case of FIG. 5 is similar to that in the case of FIG. 4. The transmission candidate selecting unit 203 selects the candidate corresponding to the smaller of the perturbation quantities $\Delta u$ calculated by the perturbation quantity calculating unit 202 for the set 1 and the set 2, respectively, determines the candidate as a transmission signal, and generates a polarization multiplexed optical signal 206.

The above operation of FIG. 5 is sequentially performed while symbols are shifted one by one symbol, as in the case of FIG. 4.

In the operation of the perturbation quantity calculating unit 202 in the case of FIG. 5, three previous symbols and three subsequent symbols with respect to the target symbol are considered, and therefore an amount of calculation is increased as compared with the case of FIG. 4 in which only one previous symbol and one subsequent symbol with respect to the target symbol are considered. However, in the case of FIG. 5, the perturbation quantity of the generated polarization multiplexed optical signal 206 is decreased, and nonlinear suppression may be performed more precisely.

Even in a case where five previous symbols and five subsequent symbols with respect to the target symbol, a total of 11 symbols are considered, for example, only a sufficiently small amount of calculation is involved. In this case, the perturbation quantity Δu calculated in the operation of the equations of Expression 1 may be reduced to about 80 percent as compared with a case where no provision is made.

A dual polarization 8-phase shift keying (DP-8PSK) system, for example, in which a higher multi-level degree is achieved, may be adopted as a polarization multiplexing system. This modulation system originally has a transmission capability of 6 bits/symbol, and when this modulation system is regarded as a four-dimensional modulation system, 64 signal points are present on a four-dimensional space. In a case where the signal space is divided into four sets 205, for example, 2 bits of the 6 bits are consumed for selection of a set. The transmission candidate selecting unit 203 selects a candidate corresponding to the smallest of perturbation quantities Δu obtained from the equations of Expression 1 by the perturbation quantity calculating unit 202 in the four sets 205 set by the transmission candidate generating unit 201. Transmission performance is 6 bits−2 bits=4 bits/symbol, and is substantially equal to DP-QPSK. However, a case where the perturbation quantity is smallest may be selected from four candidates. Therefore, as compared with the example in which the above-described DP-QPSK is adopted, nonlinear suppression may be performed more precisely.

Thus, as the number of divisions of the signal point sets 205 is increased, more precise nonlinear suppression may be performed. However, transmission capability is correspondingly decreased. It is therefore desirable to select an optimum number of divisions according to a transmission line condition. The first embodiment may be similarly applied also to modulation systems having an even higher multi-level degree such as dual polarization-16 quadrature amplitude modulation (DP-16QAM) system and the like.

As described above, while the transmission capacity is decreased, the nonlinear effect may be suppressed with a small amount of calculation. A transmission distance may therefore be lengthened.

As described above, the transmitting side optical transmission device 101 in FIG. 1 consumes a part of a number of bits that may be transmitted by one symbol for selection of a set 205. A rule for the selection is obvious according to the equations of Expression 1. Thus, consideration will be given to utilizing the bits consumed for the selection in error detection/correction in the receiving side optical transmission device 102.

Figure 6:
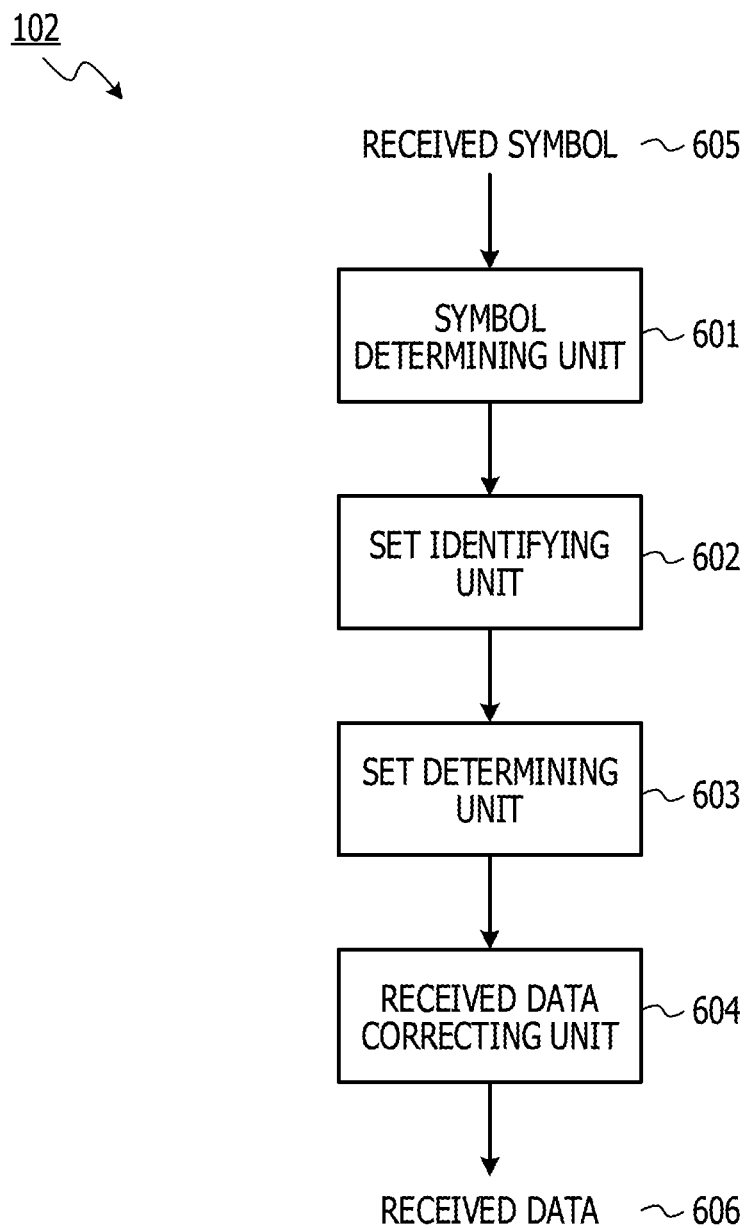
FIG. 6 illustrates an example of a receiving side optical transmission device.

FIG. 6 illustrates an example of a configuration of the receiving side optical transmission device 102 in FIG. 1. The receiving side optical transmission device 102 includes: a symbol determining unit 601 that determines a received symbol 605; a set identifying unit 602 that identifies a set to which the determined symbol belongs; a set determining unit 603 that determines whether the set is selected correctly; and a received data correcting unit 604 that makes a correction when the selected set is not correct. Received data 606 is determined in the receiving side optical transmission device 102. The symbol determining unit 601, the set identifying unit 602, the set determining unit 603, and the received data correcting unit 604 may function by execution of a program by a processor, for example.

Figure 7:
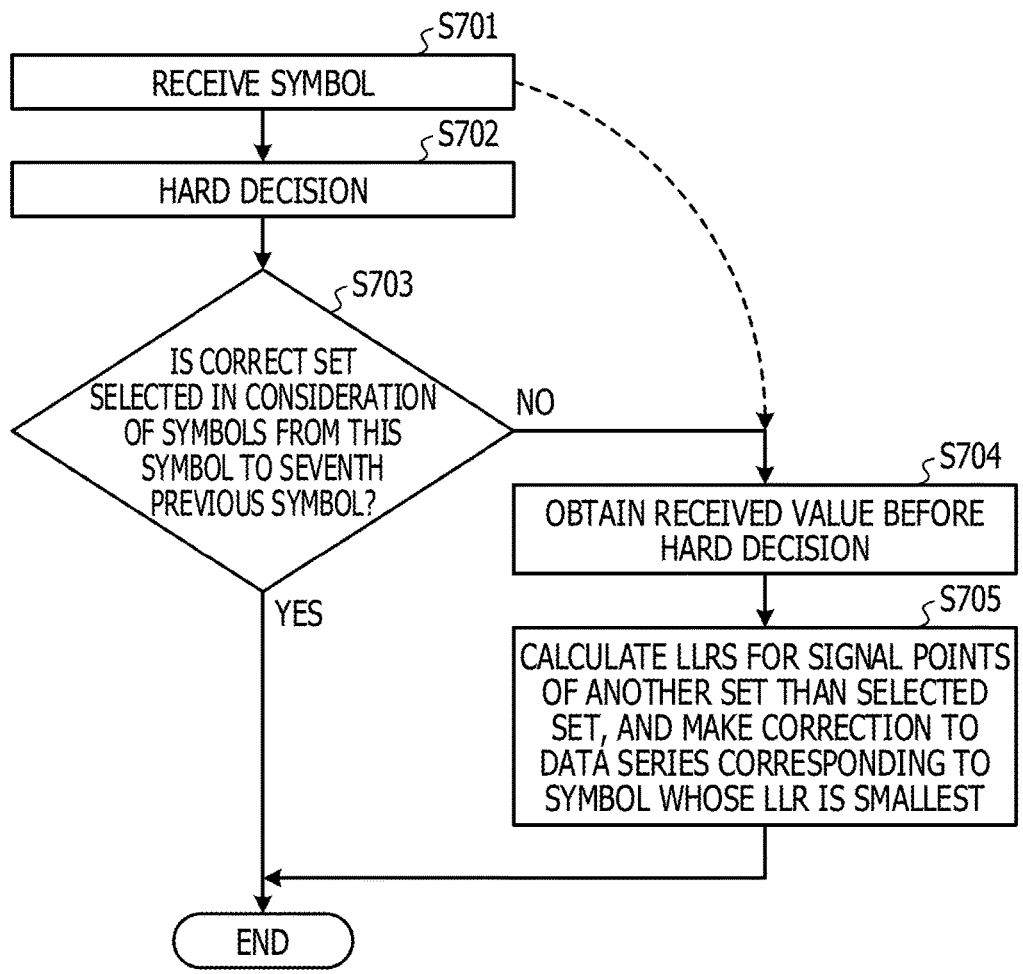
FIG. 7 illustrates an example of operation of a receiving side optical transmission device.

FIG. 7 illustrates an example of operation of the receiving side optical transmission device 102 including the configuration of FIG. 6. Description will be made of the operation of the receiving side optical transmission device 102 in a case where up to three previous symbols and three subsequent symbols with respect to the target symbol as described with reference to FIG. 5, for example, are considered.

A symbol is received (step S701). This is demodulation processing in DP-QPSK, for example.

The symbol determining unit 601 and the set identifying unit 602 in FIG. 6 perform symbol determination and set identification by performing hard determination processing on the received symbol 605 (step S702). As a result of this, the received symbol 605 is judged to be one of the symbols of the 16 patterns illustrated in FIG. 3, and at the same time, it becomes clear which of the set 1 or the set 2 is selected in the symbol.

The set determining unit 603 in FIG. 6 performs processing similar to that of the perturbation quantity calculating unit 202 and the transmission candidate selecting unit 203 in the transmitting side optical transmission device in consideration of symbols from the symbol determined in step S702 to a seventh previous symbol, and determines whether or not a correct set is selected by comparison with a result of the processing (step S703). A determination criterion as to whether or not a correct set is selected is whether a set corresponding to a smaller perturbation quantity is selected.

When it is determined as a result of the determination in step S703 that a correct set is selected, a data series corresponding to the received symbol 605 is output as received data 606, and processing in a subsequent stage in the receiving side optical transmission device 102 is made to proceed.

When it is determined as a result of the determination in step S703 that a correct set is not selected, on the other hand, the received data correcting unit 604 in FIG. 6 performs the following processing. The received data correcting unit 604 obtains a received value before the hard decision (broken line in FIG. 7), and calculates log likelihood ratios (LLR) for signal points of another set than the set identified in the hard determination processing of step S702. The received data correcting unit 604 outputs, as the received data 606 in FIG. 6, a data series corresponding to a symbol whose log likelihood ratio calculated is smallest (the above is step S705).

As described above, the receiving side optical transmission device 102 may perform error detection/correction for the received symbol 605 using information about the set selected by the transmitting side optical transmission device 101.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission device comprising:
a memory; and
a processor coupled to the memory,
the processor:
generate a first symbol by mapping a transmission data series to a first signal point which belongs to a first group within a signal space defined with regard to characteristics of an optical carrier wave of the transmission data series;
generate a second symbol by mapping the transmission data series to a second signal point belonging to a second group;
calculate a perturbation quantity of a signal electric field for each of the first and second symbols based on signal electric field vector information of a symbol which is generated before the first symbol and the second symbol; and
determine, as a transmission signal, a symbol having a smaller perturbation quantity between the first symbol and the second symbol.

2. The optical transmission device according to claim 1, wherein the optical carrier wave is a vertically polarized wave and a horizontally polarized wave in a polarization multiplexed optical signal, and the signal space is defined as a multidimensional modulation determined by a combination of one of phase modulation, amplitude modulation, and quadrature amplitude modulation of the vertically polarized wave and one of phase modulation, amplitude modulation, and quadrature amplitude modulation of the horizontally polarized wave.

3. The optical transmission device according to claim 1, wherein the processor is configured to:
generate a plurality of different mapping patterns in which input data of bits as the transmission data series are mapped to a signal point in a first polarized wave as the first signal point and a signal point in a second polarized wave as the second signal point; and
calculate a nonlinear component of a signal electric field amplitude of a target symbol based on electric field information of a first number of symbols which are transmitted before the target symbol and signal electric field vector information of a second number of symbols transmitted after the target symbol.

4. The optical transmission device according to claim 3, wherein the processor is configured to:
select a mapping pattern that decreases the nonlinear component from the plurality of different mapping patterns;
generate a symbol which corresponds to the second number-th symbol counted from the target symbol and is transmitted after the target symbol, by mapping the input data of the bits to the signal point in the first polarized wave and the signal point in the second polarized wave with the selected mapping pattern; and
generate a polarization multiplexed optical signal according to the mapping.

5. The optical transmission device according to claim 1, wherein the processor is configured to obtain the first symbol corresponding to the first group and the second symbol corresponding to the second group by mapping the transmission data series of a number of bits, which is obtained by subtracting a number of bits that identifies the first group and the second group from a number of bits when the transmission data series is mapped directly to a signal point within the signal space, to the signal point belonging to the first group and the signal point belonging to the second group, respectively, in the signal space in a duplicated manner for each of the first and second groups.

6. The optical transmission device according to claim 1, wherein the processor is configured to:
determine a received symbol;
identify a set to which the received symbol belongs, the set being used for generation in a transmitting side optical transmission device; and
determine, for the determined symbol, whether or not the identified set is correct by determining whether or not a set selected by calculation of the perturbation quantity and determination of the transmission signal by the transmitting side optical transmission device matches the identified set.

7. The optical transmission device according to claim 6, wherein, when the processor determines that the identified set is not correct, the processor is configured to calculate a log likelihood ratio for a signal value of each symbol within another set than the identified set for a received value of the received symbol, and correct, as received data, a data series corresponding to a symbol whose log likelihood ratio is smallest.

8. The optical transmission device according to claim 6, wherein, by identifying a region in which the received symbol corresponds to a signal point within the signal space, the processor is configured to identify a set assigned in correspondence with the region.

9. An optical transmission method comprising:
generating, by a computer, a first symbol by mapping a transmission data series to a first signal point which belongs to a first group within a signal space defined with regard to characteristics of an optical carrier wave of the transmission data series;
generating a second symbol by mapping the transmission data series to a second signal point belonging to a second group;
calculating a perturbation quantity of a signal electric field for each of the first and second symbols based on signal electric field vector information of a symbol which is generated before the first symbol and the second symbol; and
determining, as a transmission signal, a symbol having a smaller perturbation quantity between the first symbol and the second symbol.

10. The optical transmission method according to claim 9, wherein the optical carrier wave is a vertically polarized wave and a horizontally polarized wave in a polarization multiplexed optical signal, and the signal space is defined as a multidimensional modulation determined by a combination of one of phase modulation, amplitude modulation, and quadrature amplitude modulation of the vertically polarized wave and one of phase modulation, amplitude modulation, and quadrature amplitude modulation of the horizontally polarized wave.

11. The optical transmission method according to claim 9, further comprising:
generating a plurality of different mapping patterns in which input data of bits as the transmission data series are mapped to a signal point in a first polarized wave as the first signal point and a signal point in a second polarized wave as the second signal point; and
calculating a nonlinear component of a signal electric field amplitude of a target symbol based on electric field information of a first number of symbols which are transmitted before the target symbol and signal electric field vector information of a second number of symbols transmitted after the target symbol.

12. The optical transmission method according to claim 11, further comprising:

selecting a mapping pattern that decreases the nonlinear component from the plurality of different mapping patterns;

generating a symbol which corresponds to the second number-th symbol counted from the target symbol and is transmitted after the target symbol, by mapping the input data of the bits to the signal point in the first polarized wave and the signal point in the second polarized wave with the selected mapping pattern; and generating a polarization multiplexed optical signal according to the mapping.

13. The optical transmission method according to claim 9, further comprising:

obtaining the first symbol corresponding to the first group and the second symbol corresponding to the second group by mapping the transmission data series of a number of bits, which is obtained by subtracting a number of bits that identifies the first group and the second group from a number of bits when the transmission data series is mapped directly to a signal point within the signal space, to the signal point belonging to the first group and the signal point belonging to the second group, respectively, in the signal space in a duplicated manner for each of the first and second groups.

14. The optical transmission method according to claim 9, further comprising:

determining a received symbol;

identifying a set to which the received symbol belongs, the set being used for generation in a transmitting side optical transmission device; and determining, for the determined symbol, whether or not the identified set is correct by determining whether or not a set selected by calculation of the perturbation quantity and determination of the transmission signal by the transmitting side optical transmission device matches the identified set.

15. The optical transmission method according to claim 14, further comprising:

calculating, when determining that the identified set is not correct, a log likelihood ratio for a signal value of each symbol within another set than the identified set for a received value of the received symbol, and correct, as received data, a data series corresponding to a symbol whose log likelihood ratio is smallest.

16. The optical transmission method according to claim 14, further comprising:

identifying, by identifying a region in which the received symbol corresponds to a signal point within the signal space, a set assigned in correspondence with the region.

* * * * *